W. R. BILLINGS.
MEASURING FAUCET.
APPLICATION FILED APR. 18, 1917.

1,271,839.

Patented July 9, 1918.
3 SHEETS—SHEET 1.

INVENTOR
William R. Billings
BY
Fred A. Tasker
ATTORNEY

W. R. BILLINGS.
MEASURING FAUCET.
APPLICATION FILED APR. 18, 1917.
1,271,839.
Patented July 9, 1918.
3 SHEETS—SHEET 2.
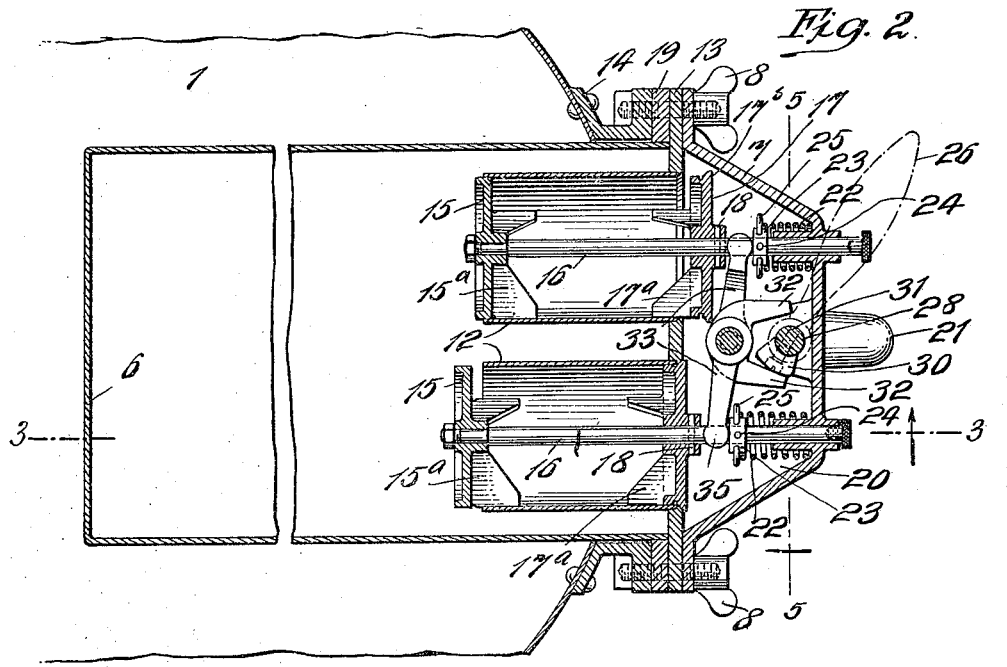
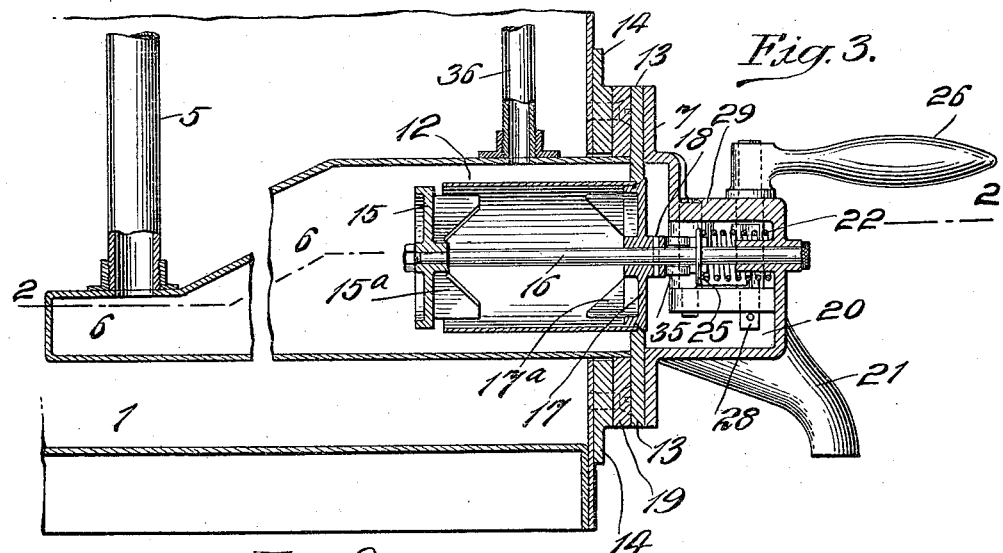
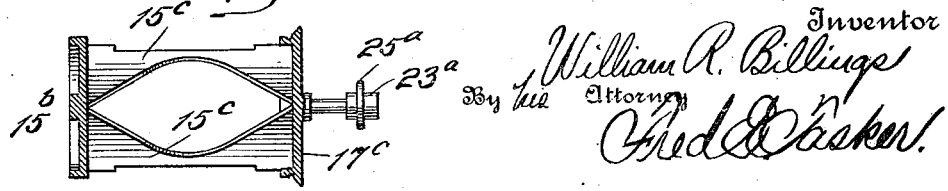

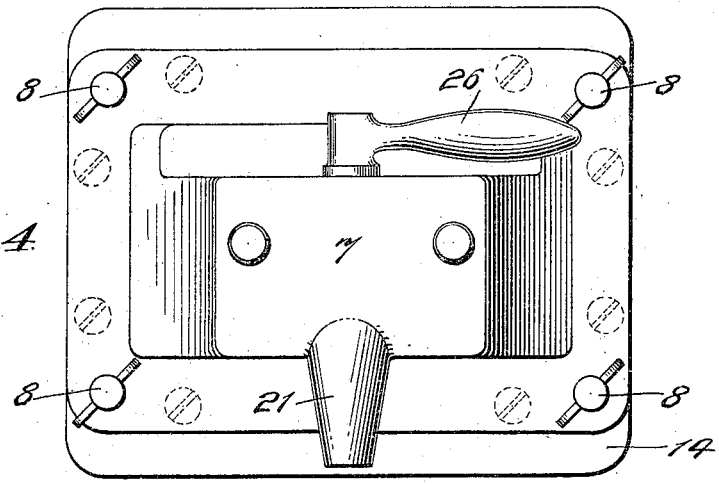
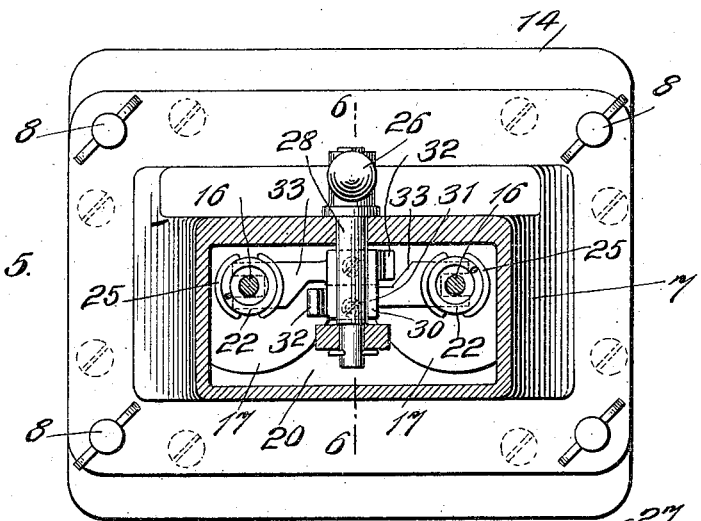
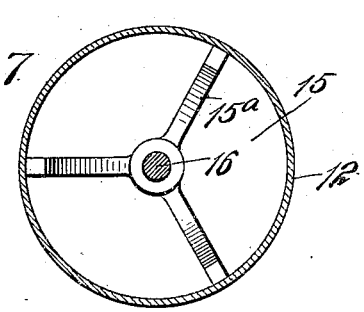
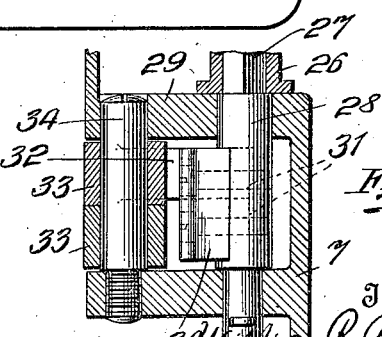

UNITED STATES PATENT OFFICE.

WILLIAM R. BILLINGS, OF BROOKLYN, NEW YORK.

MEASURING-FAUCET.

1,271,839.        Specification of Letters Patent.        Patented July 9, 1918.

Application filed April 18, 1917. Serial No. 162,838.

*To all whom it may concern:*

Be it known that I, WILLIAM R. BILLINGS, a citizen of the United States, and resident of the borough of Brooklyn, city of New York, in the county of Kings and State of New York, have invented certain new and useful Improvements in Measuring-Faucets, of which the following is a specification, reference being had therein to the accompanying drawing.

This invention relates to measuring faucets for use with various kinds of liquids or fluids. The object of the invention is to enable a predetermined quantity of the liquid or fluid to be withdrawn from an urn or other receptacle in such a manner that the measurement and dispensing of the quantity is made quickly and easily through the manipulation of a faucet handle and without the necessity of complicated measuring or weighing adjustments. A leading feature of the invention is to enable milk, coffee, tea, and other light beverages to be quickly served with just the right quantity emitted from the faucet at each turn of the same to fill a drinking cup or other receptacle without loss by spilling. The invention is also intended generally for the handling of all kinds of liquid or fluid substances in premeasured quantities, fixed amounts of which it is desired to apportion or distribute in various ways. In my copending application for Letters Patent for measuring faucets, filed October 11, 1916, Serial No. 124,942, I have described and claimed another form of measuring faucet, and have also set forth in said application a number of broad claims which apply generically to the invention in said case as well as to that in the present case.

The invention in the present application, therefore, may be said to consist essentially in the construction, arrangement, and combination of the various parts, substantially as will be hereinafter described and then more particularly pointed out in the claims.

In the accompanying drawing illustrating my invention:

Fig. 2 is a horizontal section of the same on the line 2, 2 of Fig. 3;

Fig. 3 is a vertical section on the line 3, 3 of Fig. 2;

Fig. 4 is a front end elevation;

Fig. 5 is a sectional front view on the line 5, 5 of Fig. 2;

Fig. 6 is an enlarged detail section on the line 6, 6 of Fig. 2;

Fig. 7 is a cross-section of one of the piston valve closures for the measuring compartments;

Fig. 8 is a view of a modified form of valve device in which an inlet and outlet valve for a measure are made in a single unit.

Similar characters of reference designate corresponding parts throughout the different figures of the drawing.

Figure 1:
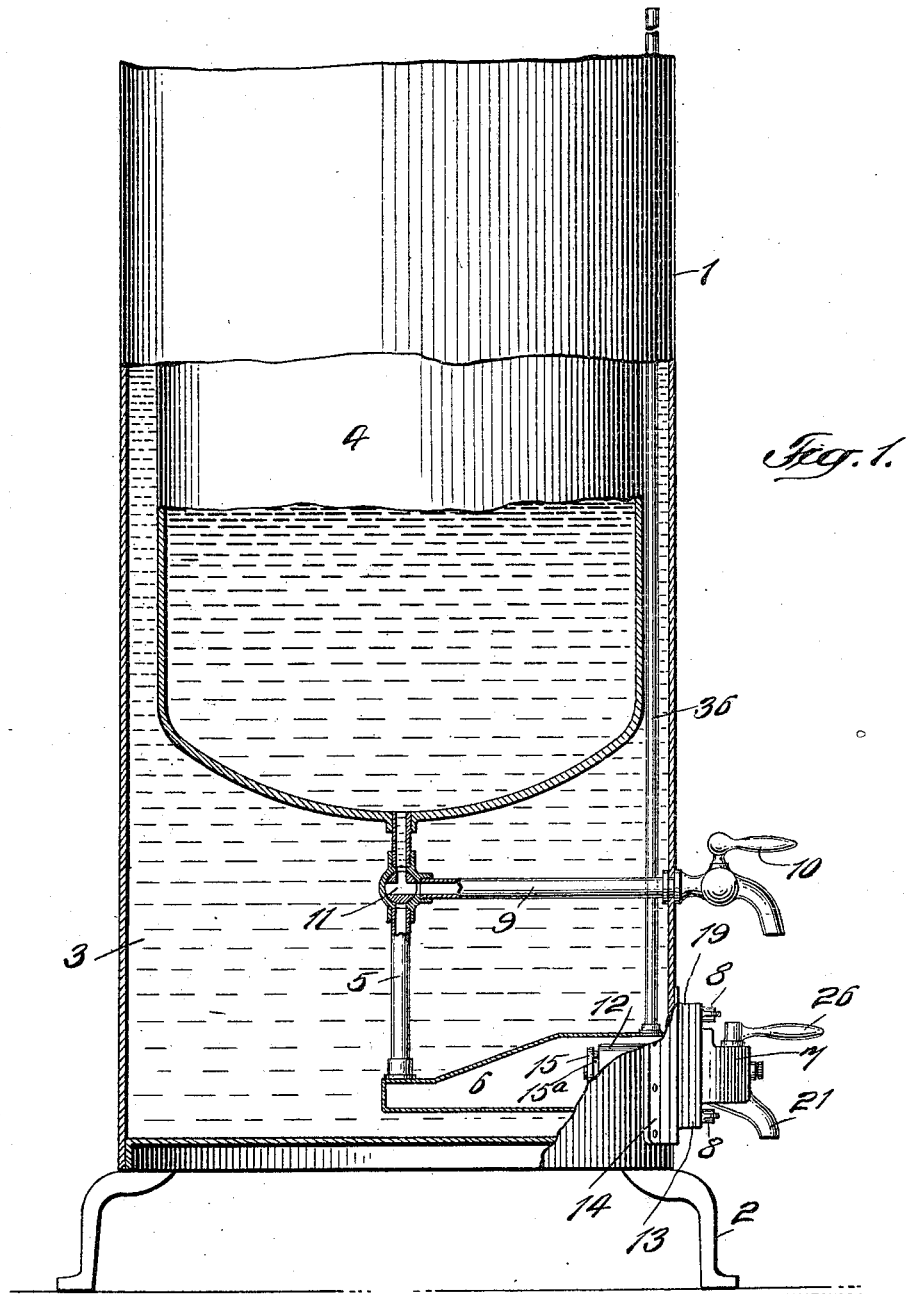
Figure 1 is a vertical section in partial elevation of an urn or tank provided with my improved measuring faucet.

Simply for the purpose of easy explanation and with no intention of restricting the invention to any such special application, I have delineated in Fig. 1 the outer jacket 1 of a coffee, tea, cocoa, or other urn, supported on legs 2, and containing an inner hot water chamber 3, within which is held a main coffee or beverage chamber 4, which latter communicates through a pipe 5 with a supplemental submerged beverage or receiving chamber 6 within the hot water in the chamber 3 near the bottom of the latter and close to the draw-off appliances. Said receiving chamber has a suitable air vent, as for example, the vertical pipe 36 running to the atmosphere. The front open end of the supplemental beverage chamber 6 is contiguous to the jacket 1 of the urn at a point where said end of chamber 6 is covered by a removable cover plate 13 secured in position by means of a plurality of thumb screws or clamps 8 or other equivalent devices as clearly indicated in various figures of the drawing, and outside of cover 13 is the discharge chamber 20 formed by angular cover 7 opposite to plate 13.

Running from the pipe 5 to a point outside of the wall 1 of the urn is a horizontal pipe 9 which is provided outside of the urn with a mixing or draining faucet 10. At the junction of the pipes 5 and 9 is a three-way or other cock 11 which can be turned to provide a passage from the main beverage chamber 4 to the supplemental submerged beverage chamber 6, or to provide a passage from the main chamber 4 to the draining faucet 10, so that when desired the contents of the chamber 4 may be withdrawn directly through the faucet 10, and also when desired the three-way cock 11 may be turned so as to allow a flow of the beverage to take place downwardly from chamber 4 into chamber 6, at which time the faucet 10 will be inoperative. The cock 11 may be provided with any desired means for operating the same, as for example, a handle which extends through the wall 1 of the urn and is operative from the outside, said handle being placed either on the front or at the side of the urn or elsewhere as may be preferred.

Arranged inside of the supplemental beverage compartment 6 is a number of measures or measuring chambers 12, say, for example, two of them, although there may be more or less if desired, and they may be of the same or different sizes. The invention operates equally well with a single measuring device. In the example shown in the drawings I have given two of them of the same size consisting of elongated open-ended cylinders 12 carried by a removable cover plate 13, said cylinders lying horizontally within the chamber 6 and having one end secured in an opening in said cover plate 13, the cylinders being integral with plate 13 or secured thereto in some convenient way. Each one of these measuring compartments 12 has a capacity equal to any predetermined quantity of fluid or liquid which it is desired to measure, as for example, a quantity equal to the contents of an ordinary coffee cup. At one end of each measuring chamber 12, the inner or filling end, is a piston valve or cover 15 of proper size to fit closely and easily within the end of the measure 12 and preferably provided with a plurality of inwardly extending guide wings 15$^a$, three of them for example, (see Fig. 7) arranged in a spider form and which operate within the barrel of the measure so as to keep the piston cover 15 properly alined with respect to the end of the measure so that it can pass into and out of said end in closing and opening the end of the measure. Said piston cover 15 is carried by a spindle or rod 16 which runs longitudinally through the center of the measure 12 and projects beyond the other and outer end of the same where it is subject to various mechanical operations in a manner I shall presently describe. Each spindle 16 not only carries a piston valve at the inner end of the measure 12 but it also carries another piston valve 17 at the outer or discharge end of cylinder 12, said piston valve 17 having a central hub or boss provided with a pin 18 by means of which the said piston valve 17 is firmly secured to the spindle 16. Said piston valves 17 are each provided with a spider arrangement of inwardly projecting guide wings 17$^a$, three of them, or more, similar to the wings 15$^a$, which extend into the interior of the measure 12 and slide on the inside surface of the wall thereof while the cover is being moved back and forth with relation to the outer end of the measure 12. Piston valves 17 are not only formed with a section which fits closely within the end of the measure 12 and thus closes said end at times and opens it when it is removed therefrom, but are also provided with a bevel faced flange 17$^b$ which seats against a bevel seat in the end of the measure 12, or contiguous thereto in the opening in the cover 13, so that this bevel ring 17$^b$ may thus fit against the end of the measure 12 and make a firm and positive stop at that point so as to provide an effective closure for this end of the measure at times.

It will be noted that in regard to each measure, therefore, there is a piston cover or valve at one end and another at the other end, both of which are fixedly secured upon a longitudinal spindle which carries them, and they are so distanced apart that when one is so related to the end of the measure as to close it, the other will be so related to the opposite end of the measure as to open the latter, and they may be placed at the proper distance apart so that one end or the other will always be open. Ordinarily, one will be closed when the other is open so that there may be a filling at one end while the other is closed, or there may be an emptying at one end while the other is closed.

Outside of the cover plate 13 at the end of the receiving chamber 6 is an angular casting 7, which with the plate 13 forms a discharge chamber 20 on the outside of the urn, receiving the liquid from the measures and passing it out into a cup or receiving utensil. The thumb screws 8 which pass through the cover plate 13 also pass through the flanged edge of the casting 7 and connect all the parts firmly to the urn, it being noted that a saddle-shaped casting 14 is conveniently riveted to the side of the urn to receive and carry these parts, and also that the flange 19 of the receiving chamber 6 is interposed between the saddle piece 14 and the cover 13 to make a tight joint and afford a proper support for the receiving chamber. The discharge chamber which I indicate at 20 receives the measured quantities of liquid which are emptied thereinto alternately or successively from one or both of the measuring chambers 12, and this liquid is allowed to flow out of the chamber 20 and be discharged through a central spout 21 into any receptacle or receiver placed below said spout, the discharge obviously being in predetermined quantities in accordance with the operation of the invention as I have already heretofore outlined. This discharge chamber not only provides a single outlet for a plurality of inner measuring devices, but it also surrounds and incloses the working parts so that they are protected from injury and dirt in any way.

It is to be noted moreover that the spindles 16 of the valve mechanism at the ends of the measuring chambers are supported in horizontal bearings or bosses 21, formed of a suitable length and diameter and cast integrally with the outer angular casting 7 of the discharge chamber 20. Thus the spindles 16 pass axially through the measuring chambers 12 and also through the interior of the discharge chamber 20 and into the bearings 21 in which they slide back and forth under the influence of the bell-crank levers to be presently described. Around a portion of the spindles 16 that are within the chamber 20 are coiled springs 22 which are also preferably coiled more or less around the bearings 21 that lie inside of the discharge chamber 20, said springs 22 being tensioned between the interior surface of the outer casting 7 and collars or flanges 23 which are pinned at 24 to the spindles 16, said collars being provided preferably with wing-shaped flanges 25 against which the ends of these springs 22 bear, said flanges 25 being segments of a circle and leaving spaces between their ends for the insertion of the pins 24 which hold the collars 23 upon the spindles 16. The effect of these springs is to urge the piston cover valves 17 toward the discharge ends of the chambers 12, and close said ends, while at the same time moving the inlet valves 15 out of the opposite ends of chambers 12 and opening said latter ends. In Fig. 2 one of the springs 22 belonging to the spindles 16 is shown extended and the other is shown as compressed, the extended position being of that one which is acting to hold the valve 17 closed, while the other spring 22 is under compression under the action of the lever device which is opening the valve 17 temporarily to allow a discharge of the contents of one of the measuring chambers 12. Obviously the springs may be differently arranged, but it is desirable to have compressible yielding devices for automatically closing the piston valves 17 when the opening agency which at times acts thereon temporarily ceases its action.

26 designates a handle which controls the outlet of the liquid from the entire faucet and causes it to flow out in predetermined quantities through the spout 21. This handle 26 may be vibrated manually from a position where it projects centrally in front of the device to a position on either side, as indicated in dotted lines in Fig. 2 and in full lines in Fig. 4. When moved to one side it will through intervening levers open one of the measuring chambers to allow a discharge and when moved to the other side it will open another. When occupying its central or idle position both measuring chambers are closed against discharging into discharge chamber 20. Said handle 26 is applied to the squared upper end 27 of a vertical bolt 28 which is journaled in casting 29 that is integral with and forms a part of the front casting 7 of the discharge chamber 20 (see Figs. 2, 3 and 6). This bolt 28 is provided with a cam device 30 formed integrally therewith or made as a separate member and attached by one or more screws 31, as shown in Fig. 2. Said cam 30 operates against the arms 32 of the bell crank levers 33 which are pivoted by a vertical pin 34 supported in the casting 29 parallel to and a short distance from the bolt 28.

These bell crank levers 33 constitute very important features of my device. Their longer arms are preferably bifurcated or notched at 35 to embrace the spindles 16 loosely at a point between the piston valve 17 and the spring-holding collars 23 (see Figs. 2 and 3), it being understood that as these horizontal bell cranks vibrate back and forth in a horizontal plane under the action of the handle 26 they will have the effect of acting against the collars 23 and consequently compressing the springs 22 at the same time that they open the piston valves 17 that are secured to the spindles 16, so that thus by the proper manipulation of the handle 26 it brings the cam 30 to bear upon one or the other of the arms 32 of the bell cranks. The longer arms that engage the collars 23 are operated for the purpose of opening the discharge valves 17 and allowing a discharge of the contents of the measuring chambers into the discharge chamber 20, from which it can pass off by the spout 21. The short arms 32 of these bell crank levers, as seen in plan view of Fig. 2, are removed a short distance from each other and project from the neighborhood of the pin 34 toward the bolt 28, so that the cam 30 may have its field of operation between these two arms 32, and be capable of affecting and oscillating either one of them according to the direction in which the handle 26 is turned; and when the said handle 26 occupies an intermediate position, projecting immediately in front of the device, said cam 30 will lie between the two arms 32 without acting against either of them, there being enough room between them for this purpose, at which time the whole device will be idle; but as neither of the springs 22 will now be compressed the effect of both of said springs will be to keep both discharge valves 17 closed, and both inlet valves 15 open so that communication may be made between the receiving chamber 6 and both measuring cups. It is quite obvious that the forked ends 35 of the bell crank levers 33 may be differently fashioned, as it is only necessary that they should be so made that they will bear properly upon the parts that are connected to the valves and operate the same. Also I find it most convenient that one bell crank lever 33 should lie on top of the other bell crank lever 33, both being pivotally arranged with the same pivot 34, as shown in Fig. 6, and in order to do this the bell crank levers will be properly shaped to suit this arrangement and permit the proper amount of vibration to these levers.

It will thus be seen that the whole device is under the control of the single front handle 26 and that I am enabled to draw off portion after portion of the liquid contents of the device in predetermined quantities without any waste through spilling or leakage and without any slopping or disagreeable handling. As the cups or measuring devices 12 have their ends provided with valves which close or unclose the entire ends, they are able to fill and discharge very promptly. The handle 26 can be moved back and forth and the measuring compartments discharged alternately, or the same measuring compartment or cup filled and discharged time after time by simply giving the handle a momentary period of rest when in its neutral or intermediate position which will be sufficient for the same measure to again fill; hence, the operator can push the handle back and forth as he pleases, either vibrating it from one side to the other or vibrating it again and again on the same side of the central point; the instrument, therefore, being capable of handling by unskilled and thoughtless persons as well as by others, and always discharging the proper premeasured amount, so that it subserves the object of economy, besides being very simple in its construction and mode of working, and will be found to have very many other attending advantages in practice. It is unnecessary to describe further the character of the operation as that is sufficiently evident from the foregoing description of the construction and arrangement of the parts, and it will be also seen that the shape and size and number of many of the parts may be modified within very wide limits without exceeding the scope of the invention.

If desired the spindles 16 may be entirely omitted and the valves 15$^b$ and 17$^c$ belonging to the same measure may be cast as a single unit, as indicated in Fig. 8, in which case the guide wings will be transformed into a suitable number of connections 15$^c$ between the valves, which may be light in weight and small in size, providing only a short guiding edge sufficient to enable the valves to properly seat and unseat, in which case also it is only necessary that the discharge valve 17$^c$ shall be provided with a short spindle 23$^a$ to carry the spring and the forked end of the bell crank lever and having a collar or projection 25$^a$ thereon against which the bell crank lever under the action of the cam-carrying handle may operate; and with which construction or with the spindle arrangement shown in the other figures of the drawing it will be found that said spindles need not run entirely through the bosses or bearings 21 but may be cut off inside the same. Emphasis should be placed upon the ease and facility with which all the parts of my device may be assembled and disassembled throughout, making it possible to wash every part thoroughly at any time and keep the whole interior sanitary and clean. The measures 12 which are carried by the plate 13 can be readily taken out as one unit after the release of the thumb screws 8. The discharge chamber cover 7 will be another unit carrying therewith the bell crank levers, operating handle, valves, etc., but the valves can be readily detached from the bell crank levers and the springs also separated from the other parts, and by a simple manipulation of the different members they can all be taken apart so as to be washed and thoroughly cleaned and this is done instantly and without any complicated changes, and then after the cleaning and drying is performed they can be immediately reassembled with equal despatch and ease so that the advantages of the device are evident from a sanitary point of view as well as from that of economy and ease of operation.

Many changes may obviously be made in the construction and relative arrangement of the various parts in addition to these special changes which I have just enumerated and described, and I desire it expressly understood, therefore, that I do not intend to be limited to the precise members and their form and arrangement as set forth, but shall vary and modify the same within wide limits to the end that the best results in actual practice may be secured, provided only I do not exceed the scope of the appended claims.

Having thus described my invention, what I claim as new and desire to secure by Letters Patent, is:—

1. In a measuring faucet, the combination of a main liquid chamber, a supplemental receiving chamber at a distance therefrom and communicating therewith, a submerged measure in the latter chamber, a faucet, and means whereby communication may be established between the main chamber and the supplemental chamber, or between the main chamber and the faucet.

2. In a measuring faucet, the combination of a main liquid chamber, a supplemental receiving chamber at a distance therefrom and communicating therewith, a submerged measure in the latter chamber, a faucet, and means whereby communication may be established between the main chamber and the supplemental chamber, or between the main chamber and the faucet, said means consisting of a three-way cock.

3. In a measuring faucet, the combination of a main chamber for the liquid to be dispensed, a water chamber in which it is located, a receiving chamber communicating with the main chamber, a submerged measure in the receiving chamber, means for emptying said measure and simultaneously closing it against the admission of any liquid until the emptying is finished, and means for controlling the passage of the liquid from the main chamber into the receiving chamber or to a point outside of the device.

4. In a measuring device, the combination of a liquid container, a hot water chamber below the same, a submerged receiving chamber in the latter chamber and communicating with the liquid container, one or more measures in said receiving chamber and carried by a cover removably attached at the outer end of the receiving chamber, a discharge chamber contiguous to said measures, inlet and outlet valves for each measure, and means for operating said valves so as to empty the measures separately, said means consisting essentially of bell crank levers, one for each measure, and a cam-provided handle for separately actuating said levers.

5. In a measuring device, the combination of a liquid container, a receiving chamber communicating therewith, an open-ended measure, a plate supporting the latter and covering one end of the receiving chamber, a pair of valves at the ends of the measure distanced from each other so that when one is open the other is closed, means for operating said valves jointly consisting essentially of a bell crank lever, and an independent handle bearing against one arm of said lever, and a discharge chamber into which the contents of the measure are discharged, said discharge chamber having an outlet.

6. In a device of the class described, the combination of a submerged receiving chamber having one end thereof open, a cover secured over said open end, a measure attached to said cover and having its opposite ends open, valves arranged in connection with said ends and distanced apart so that when one is closed the other is open, a discharge chamber secured alongside of the said cover and receiving the contents of the measure when the discharge valve is open, a bell crank lever within the discharge chamber for operating the said valves jointly, a yielding device arranged to close the discharge valve when the bell crank lever is operating thereon, and an operating handle having a cam which acts against one arm of the bell crank lever for the purpose of actuating the valves.

7. The combination of a chamber, a cover for the end thereof, measures carried by said cover and consisting of open-ended compartments, an inlet and outlet valve for each measure, means for connecting said valves together and guiding them in their movements, a discharge chamber, bell crank levers pivotally supported in said discharge chamber and acting upon the valves of the measures, and a single lever handle carrying a cam which acts against the shorter arms of the bell crank levers for the purpose of individually opening the measures, together with means for restoring the discharge valves to their closed position.

8. The combination of a receiving chamber, a discharge chamber outside thereof, a support intermediate between the discharge and the receiving chamber, measures carried by said support, an inlet and outlet valve for each measure, a bell crank lever for operating the valves of each measure separately from the valves of the other, means for pivotally supporting said bell crank levers, a handle having a cam device for operating said levers, and yielding devices for closing the discharge valve of each measure when the lever handle is in its neutral position.

9. In a device of the class described, the combination of a main chamber, a hot water chamber below the same, a receiving chamber in communication with the main chamber, a discharge chamber outside of the receiving chamber and having an outlet, a plurality of measuring compartments within the receiving chamber and having the ends thereof open, a support between the discharge chamber and the receiving chamber for carrying said measuring compartments, an inlet and an outlet valve for each measuring compartments, said valves having guide wings, means for connecting the valves of each measuring compartment together for joint operation, means for simultaneously closing the discharge valve and opening the inlet valve of each measuring chamber, bell crank levers supported in the discharge chamber and acting to open the discharge valves and simultaneously closing the valves, and a lever device for operating the aforesaid levers, which device performs its work by moving in one direction or the other.

In testimony whereof I hereunto affix my signature.

WILLIAM R. BILLINGS.